United States Patent

[11] 3,602,580

[72] Inventor Marvin S. Samuels
  Philadelphia, Pa.
[21] Appl. No. 651
[22] Filed Jan. 5, 1970
[45] Patented Aug. 31, 1971
[73] Assignees Joseph S. Zuritsky;
  Herman Zuritsky; Lee Zuritsky, all of
  Philadelphia, Pa., part interest to each

[54] METHOD AND OPTICAL SYSTEM FOR REFRACTING EYES
  11 Claims, 7 Drawing Figs.
[52] U.S. Cl. .................................................. 351/6,
  351/7, 351/9, 351/14, 351/16, 351/39
[51] Int. Cl. .................................................. A61b 3/10
[50] Field of Search .......................................... 351/6, 7, 9,
  1, 14, 15, 16, 39, 34

[56] References Cited
  UNITED STATES PATENTS
3,524,702  8/1970  Bellows et al. .................. 351/6

Primary Examiner—David Schonberg
Assistant Examiner—Paul A. Sacher
Attorney—Howson and Howson ABSTRACT: A method and optical system for simultaneously refracting both eyes of a patient by directing a narrow beam or beams of light into each eye at a point spaced from the optical axis of the eye. The beams are translated in a circular path about the optical axes of the eyes and reflected from the retina back through the ocular media. A trace of the reflected beam is obtained, for example, on photographic film and the deviation of the trace from a standard pattern provides an accurate indication of the error in the eye media. The optical system includes a source of light, filter, condensing and directing lenses and apertures to provide the desired narrow beams. It further includes means such as a rotatable prism to provide the desired circular translation of the narrow light beams and a beam splitter through which the beams initially pass and which directs the reflected beams from the eye retina through a second condensing lens system onto film where traces of the reflected beams are recorded.

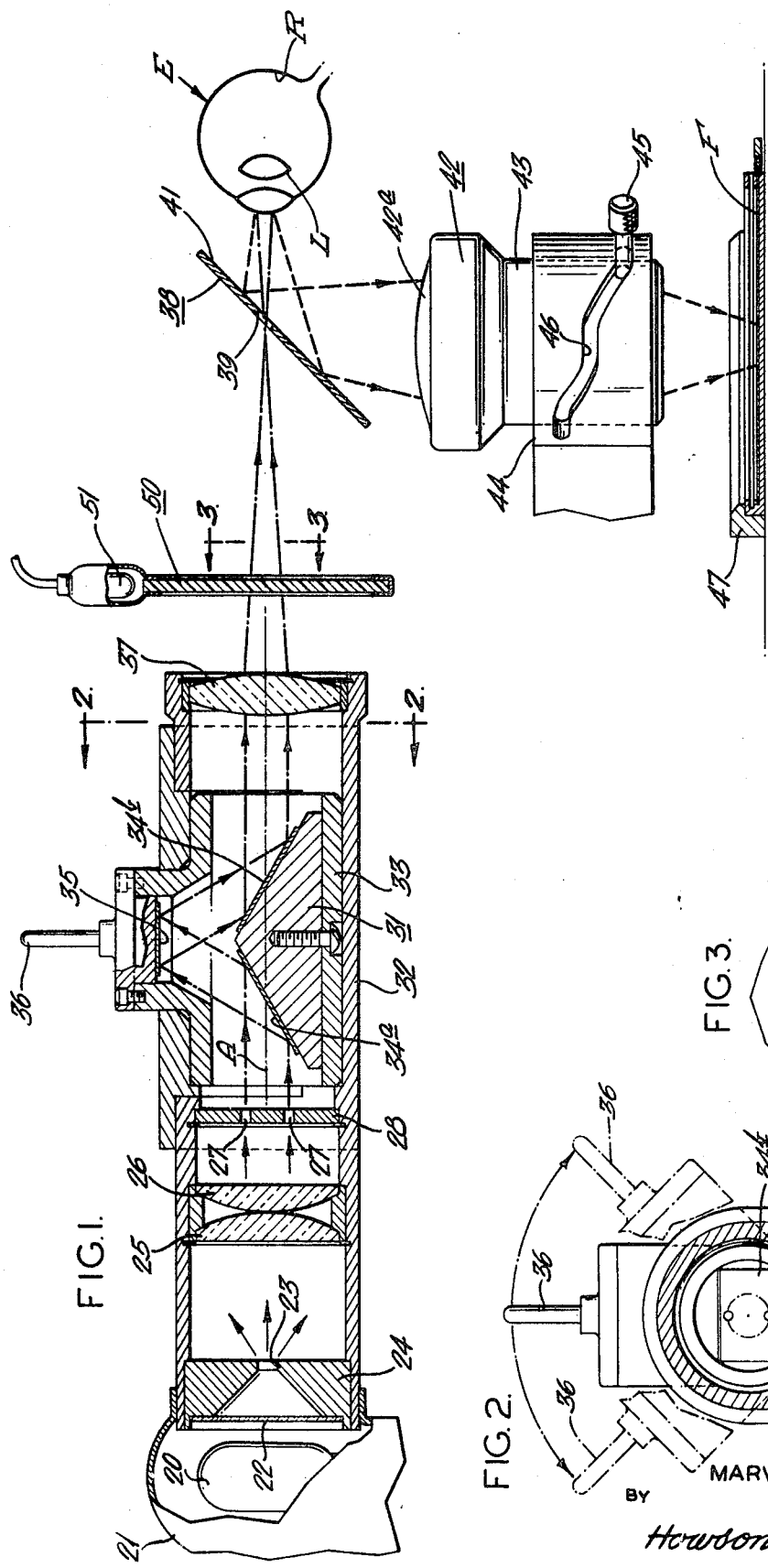

INVENTOR:
MARVIN S. SAMUELS
BY
Howson & Howson
ATTYS.

METHOD AND OPTICAL SYSTEM FOR REFRACTING EYES

This invention relates to an optical system and method for determining the refractive error and astigmatic condition of human or animal eyes.

Prior to the present invention, measurement of the refractive error and astigmatic condition of an eye has been accomplished by the use of hand lenses or a Phoropter, both of which are dependent upon the subjective responses of the patient and the subjective skill of the operator. These procedures rely upon the patient's response to vision through various lens combinations and do not give a completely accurate measurement of the refractive error of the patient's eyes. According to the present invention a circular trace of light is reflected from the retina of the patient's eyes through the patient's eye media and the change in the size and shape of the circular trace from a predetermined pattern gives an exact measurement of both refractive error and astigmatic condition of the eyes.

The measurement of the reflective trace of light can be accomplished both when the patient's eyes are in a relaxed condition by focusing at a far distance and when the patient's eyes are accommodating, for example, by being focused on an object at normal reading distance to provide the desired measurement of refractive error for both far vision and near vision and to permit a determination of whether there is a change in the astigmatic axis of either or both of the patient's eyes upon a change in focusing of the eyes from a far distance to near reading distance. These measurements will thus give the lens prescription for both far and near vision.

With the foregoing in mind a primary object of the present invention is to provide a novel optical system and novel method which will automatically determine the refractive error and astigmatic condition of both eyes of a patient simultaneously.

A further object of the present invention is to provide a novel optical system and novel method that determines the refractive error and/or the astigmatic condition of a patient's eyes without requiring the subjective response of a patient or the subjective skill of an operator.

Still a further object of the present invention is to provide a novel optical system and method that determines and records the refractive error and astigmatic condition of the eyes of a patient.

Still a further object of the present invention is to provide ophthalmic apparatus that determines refractive error conditions of an eye and astigmatic conditions in an eye automatically and which will provide traces of reflected light from the eye permitting an accurate prescribing of lens correction and astigmatic correction for both the distance portion of the optical lens and for the bifocal portion of the optical lens.

Still a further object of the present invention is to provide novel ophthalmic apparatus which contains a relatively simple optical system and which can be operated easily, quickly and automatically to determine refractive error and astigmatic conditions of eyes.

These and other objects of the present invention and the various features and details of the operation and construction thereof are hereinafter more fully set forth and described with reference to the accompanying drawings in which:

FIG. 1 is a plan view partially in section of an optical system for determining the refractive error and astigmatic condition of an eye;

FIG. 2 is a sectional view taken along line 2—2 of FIG. 1 illustrating a portion of the means for translating diametrically spaced beams of light through circular arcs of 180° to provide the desired circular trace of light;

FIG. 3 is an enlarged view taken along line 3—3, FIG. 1;

Figure 4:
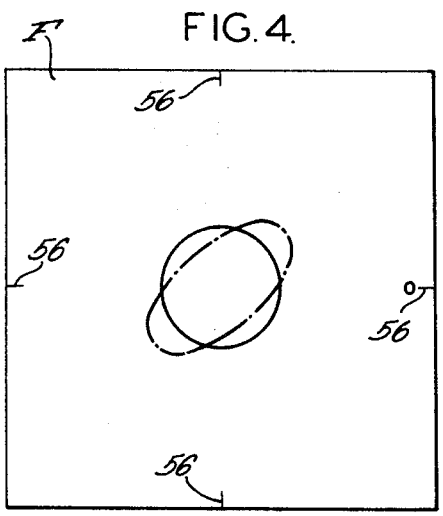
FIG. 4 is a representation of a trace of reflective light showing in solid lines a refractive error in an eye and in broken lines a combination of an astigmatic condition and a refractive error of an eye.

Referring more specifically to the drawings, there is illustrated in FIG. 1 an optical system designed to produce a pair of narrow beams of light equally spaced apart at opposite sides of the optical axis A of an eye E and direct the beams of light inwardly through the lens L of the eye to the retina R. The beams are then reflected back from the retina through the lens of the eye and are then directed through the remainder of the optical system onto a sheet of photographic film F. In addition, the optical system is provided with means for rotating the narrow beams of light about the optical axis of the eye being tested so that a circular trace of light with the optical axis of the eye at substantially the center of the circular trace is formed on the retina of the eye and reflected back from the retina through the media of the eye to the sheet of photographic film F.

This formation of the circular trace of light, directing the circular trace into the eye and then directing the reflection of the circular trace from the retina to the sheet of photographic film, may be accomplished, for example, by an optical system such as that shown in FIG. 1. Referring more specifically to FIG. 1, a suitable source of light 20 contained within a reflective shield 21 is provided which produces a relatively wide beam of light. The light is passed through a suitable filter 22 which may be an infrared filter to provide infrared light which is not harmful or not objectionable to the eye of the patient being tested. Alternatively, any other suitable source of light energy may also be used.

The light leaving the filter thereafter passes through a central aperture 23 in a plate 24 and is directed through a pair of condensing lenses 25, 26. From the condensing lenses the light passes through a pair of apertures 27, 27 in an apertured plate 28. The apertures 27, 27 in the plate 28 are diametrically spaced apart equal distances at opposite sides of the optical axis A of the eye E being tested and in combination with the lenses 25, 26, produces two narrow beams of light which are parallel to each other and parallel to and equally spaced from opposite sides of the optical axis of the eye being tested.

In accordance with the present invention, these two parallel narrow beams of light are each translated 180° in a circular path about the optical axis of the eye being tested to produce the desired circular trace of light on the retina of the eye being tested. This may be accomplished, for example, by the use of a conventional K-prism mounted within a cylindrical housing 32 for rotational movement along an arc of 90° about the optical axis of the eye being tested. The K-prism is of conventional construction and includes a cylindrical sleeve 33 rotatably received within the housing 32 with the sleeve 33 carrying a prismatic support member 31 positioned normal to the optical axis A and having a pair of reflective surfaces 34a and 34b thereon. The reflective surfaces 34a and 34b are inclined at an acute angle of less than 45° to the optical axis A. A third reflective surface 35 is provided in the K-prism extending in a plane parallel to the optical axis A and parallel to the longitudinal axis of the prismatic support member 31. With this construction, the beam of light parallel to and below the optical axis A entering the K-prism will be reflected, in order, from the reflective surfaces 34a, 35, and 34b and leave the K-prism in a direction parallel to but spaced above the optical axis A a distance equal to its spacing below the optical axis upon entering the prism. Further, with this arrangement, if the K-prism is rotated 90°, the beam of light will be translated in a semicircular arc of 180°.

Thus, starting with two diametrically opposed beams of light at opposite sides of the optical axis A the 90° rotation of the K- prism will form the desired circular trace of light. As illustrated in FIGS. 1 and 2, a handle member 36 is provided to obtain the desired 90° rotation of the support housing 33 and K-prism. However, it will be understood that any desired manual or automatic means may be provided to rotate the K-prism. Alternatively, instead of the use of a K-prism an apertured plate 28 may be rotatably mounted within the lens housing 32 and means (not shown) provided to rotate the apertured plate 28 through 180° to obtain the desired circular trace of light.

After beams of light leave the K-prism, they pass through an additional condensing lens 37 which causes the beams to be converged toward one another so that the two beams are directed toward and through the lens of the eye being tested. Positioned intermediate the eye being tested and the condensing lens 37 is a conventional beam splitter 38. In the present instance the beam splitter 38 consists of a flat plate disposed at a 45° angle to the optical axis A and is provided with a central aperture 39 through which the beams of light from the lens 37 pass. The surface 41 of the beam splitting plate 38 facing toward the eye E is coated with a reflective material so that the beams of light reflected back through the media of the eye from the retina are deflected from the beam splitter 38 toward an adjustable condensing lens assembly 42. The adjustable condensing lens assembly 42 comprises a cylindrical body portion 43 mounted within a stationary support sleeve 44. An adjusting handle 45 is secured to the cylindrical body 43 and extends outwardly through a cam track 46 formed in the sleeve 44 so that movement of the adjusting handle 45 will move a condensing lens assembly 42 toward or away from the sheet of film F positioned within a film support member 47. The condensing lens assembly 42 includes at least one condensing lens 42a carried by and movable with the condensing lens body portion 43 and serves to direct the reflected beams of light and reflected circular trace toward the desired portion of the film F.

If desired, a target plate 50 may be adjustably mounted for adjustable movement toward and away from the eye being tested between the condensing lens 37 and the beam splitter 38 to provide an image on which the eye may be focused during refraction of the eye. In the present instance, the target plate 50 is illustrated as a flat sheet of transparent Lucite lighted from one edge by means of a lamp 51 and the target plate has a target pattern 52 etched on one surface thereof, as shown in FIG. 3. The target pattern 52 is small enough so that it may be viewed through the central aperture of the beam splitter 38 and will not interfere with the two narrow beams of light passing from the lens 37 to the eye E. In FIG. 3 these two beams of light are shown in broken lines as the circles 53, 53. When it is desired to test the eye for far vision, the target plate is adjusted to the position where it appears to be at a distance from the viewer so that the eye views the target in the normal relaxed condition. Similarly, when it is desired to test the eye for close vision, the target plate is adjusted to a position where it appears close to the viewer or at normal reading distance from the viewer so that the eye is in its normal accommodating condition. The adjustment of the target plate can be accomplished by moving the target plate along the optical axis A or by an adjustable lens system (not shown).

In the use of the optical system of the present invention, the condensing lens 42 is initially adjusted so that the retinal reflection of the circular trace of light from an emmetropic eye in a relaxed condition will form a circular trace on the film of a predetermined diameter. With the condensing lens 42 set in this position, the trace on the film of the retinal reflection from a nonastigmatic myopic eye will be larger in diameter than the predetermined set diameter for an emmetropic eye. Similarly, the trace of the retinal reflection on a film from a nonastigmatic hypermetropic eye will have a diameter smaller than the predetermined set diameter for an emmetropic eye. For an astigmatic eye, the trace on a film of a retinal reflection will be oval or elliptical due to the deformation of the lens of the eye being tested and the major axis of the elliptical trace will correspond to the angle of astigmatism of the eye.

Figure 5:
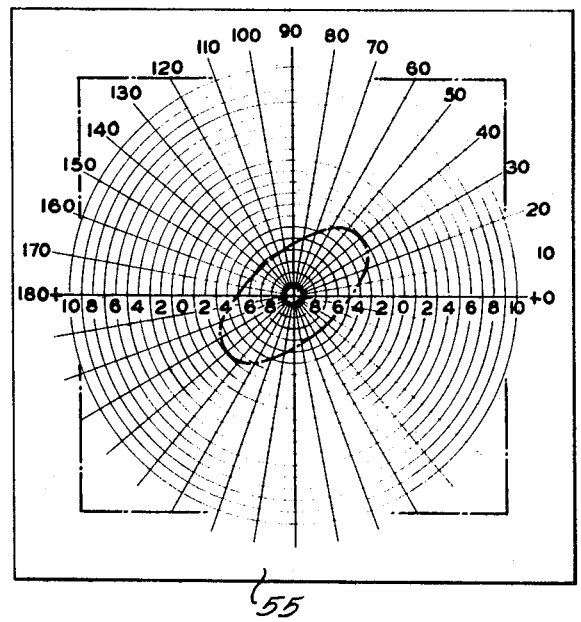
FIG. 5 is a plan view of an overlay chart which can be placed over an image of a reflected trace of light to permit rapid determination of the desired prescription to correct the refractive error and astigmatic conditions of an eye.

An overlay chart 55 such as that illustrated in FIG. 5 of the drawings may conveniently be used along with the retinal trace on the exposed developed film to determine the condition of the eye being tested and the necessary prescription for corrective lenses. The overlay chart 55 is made of a transparent material and has printed thereon a series of circles of uniformly increasing diameter and a series of radial lines of predetermined angular deviations. The circles are graduated and numbered with the number 0 at the median circle and the numbers progressing from 0 to 10 both inwardly and outwardly from the median circle. The radial lines are also numbered with their angular deviation from the horizontal. The diameter of the median circle with the number 0 on the overlay chart will correspond to the aforementioned predetermined set diameter of the retinal trace of an emmetropic eye.

This overlay chart is then indexed over the sheet of exposed developed film F containing the retinal trace of the eye being tested. The film sheet F is initially formed with index marks such as shown at 56 in FIG. 4 formed thereon and the index marks are placed in alignment with the 0°, 90°, 180° and 270° radial lines of the overlay chart, for example, as shown in broken lines in FIG. 5. Thereafter, a comparison of the trace on the exposed film with the circles and radial lines on the overlay chart will permit the user of the apparatus of the present invention to determine the lens prescription necessary to correct the vision of the eye being tested. For example, the circular trace on the film sheet of FIG. 4 has a diameter less than the diameter of the median circle of the overlay chart and in fact corresponds to a circle at the 4.5 point of the scale on the chart. Because this circular trace is smaller in diameter than the diameter of the median circle at 0 on the overlay chart, the eye tested which gave this circular trace is hypermetropic and lens prescription for this eye would be +4.5.

The elliptical trace on the film of FIG. 4 is an illustration of a trace which would be obtained from an astigmatic eye. When the overlay chart of FIG. 5 is placed over the film of FIG. 4, it can be seen that the major axis of the elipse is at 40 and the minor axis at 130, with the length of the major axis being at approximately 2.25 and the length of the minor axis lying at approximately 6.0. The length of the major and minor axes are less than the diameter of the median circle indicating the eye tested is not only astigmatic but also hypermetropic. Thus, the prescription for this lens to correct the vision of this eye would be +2.25 at 40° and +6.0 at 130°.

These above-described examples of the use of the optical system of the present invention were described in conjunction with obtaining the prescription for a lens for an eye with the eye in its relaxed condition and focusing at a point relatively far away from the eye. To determine if a bifocal correction is needed for the eye being tested, the condensing lens 42 is adjusted upwardly from the position as shown in FIG. 1 by movement of the lever 45 along the cam track 46 to a position in which the retinal reflection of a trace from an emmetropic eye would be focused at a point on the film. In the illustrated embodiment of the present invention this position of the condensing lens is reached when the lever 45 is at the upper left-hand end of the cam track 46. The target plate 50 is thereafter adjusted to a position corresponding to the normal reading distance and the eye is focused on the target image so that the eye is in the normal accommodating condition. The amount of deviation of the retinal trace from a point for the eye being tested will give the necessary presbioptic prescription to be added to the bifocal portion of the lens. If the eye being tested is an astigmatic eye, any change in the angle of the major and minor axes of the elliptical trace from the original elliptical trace obtained when the eye was in the relaxed condition will tell whether there is any change in the astigmatic condition of the eye between far and close vision and thus whether there should be any change in the astigmatic prescription for the bifocal portion of the lens.

If desired, an intermediate adjustment of the condensing lens 42 may be provided if the ophthalmologist operating the optical system of the present invention determines that a separate prescription for the trifocal portion of a lens is necessary. To determine a required trioptic prescription for the trifocal portion of the lens, the condensing lens is adjusted to the intermediate position and the target plate 50 is adjusted to an intermediate position. A trace is obtained of the retinal reflection of the eye in the photographic film and the deviation of the trace from a point will give an indication of the correction to be added to the lens for the trifocal portion of the lens.

Figure 6:
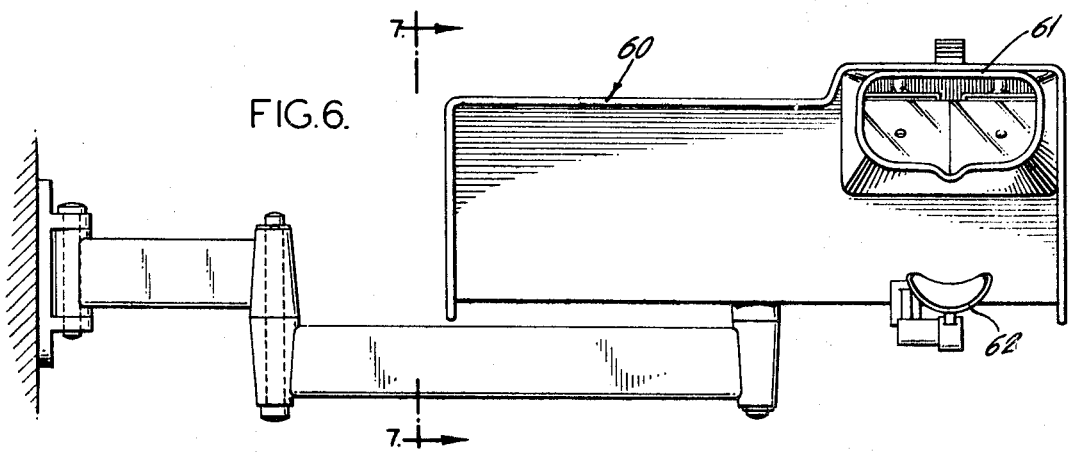
FIG. 6 is a front elevational view of ophthalmic apparatus containing a pair of lens systems as shown in FIG. 1 for refracting both of the patient's eyes simultaneously.
Figure 7:
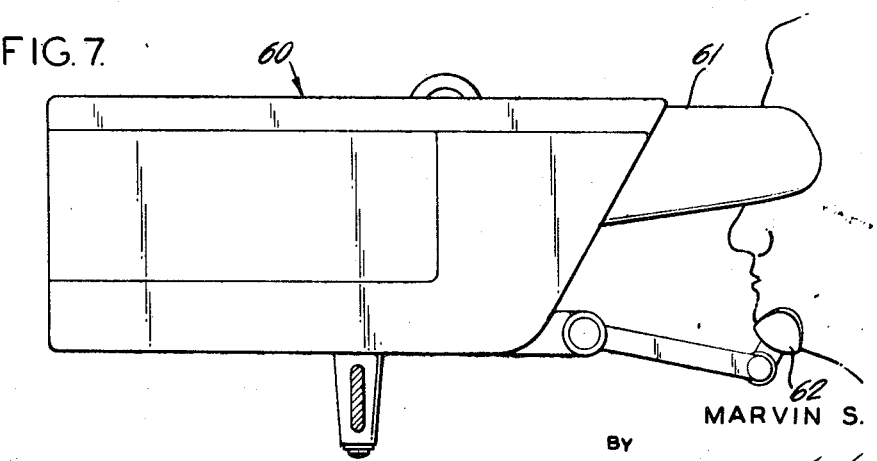
FIG. 7 is a side elevational view of the apparatus of FIG. 6 taken along line 7—7, FIG. 6.

Normally, in the operation of the optical system of the present invention both eyes of the patient are tested simultaneously. To accomplish this, two similar optical systems are provided in side by side relationship within a single casing with the trace of the retinal reflection from one eye being obtained on one-half of a sheet of film and the trace of the retinal reflection of the other eye being obtained on the other half of the same sheet of film. To this end a casing 60, such as that shown in FIGS. 6 and 7, may be provided including an eye rest portion 61 against which the patient will press his face and an adjustable chin rest 62 to properly position the patient's eyes relative to the optical axes of the two optical systems. The two optical systems may be adjustably mounted within the casing in any conventional manner for lateral and vertical movement so that the optical axis of each system may be positioned in alignment with the optical axis of the eyes of the patient being tested. The light source of both systems will be turned on and the patient will focus his eyes in accordance with instructions of the operator of the device and the K-prisms in both systems will be rotated simultaneously thus exposing the film to the trace of the retinal reflection of each eye. Each trace on the exposed developed film will then be measured separately by means of the overlay chart of FIG. 5 to obtain the necessary lens prescription.

As an alternative procedure, instead of using the overlay chart of FIG. 5, an image of the overlay chart can be recorded on the film sheet either before or after the exposure of the film sheet to the trace of the retinal reflection. This would eliminate the requirement of manually indexing the overlay chart with the exposed and developed film sheet.

From the foregoing, it is apparent that the present invention provides a novel method and optical system for refracting eyes by obtaining the permanent trace of the retinal reflection and measuring the deviation of the trace from a normal pattern. While a particular embodiment of the present invention has been illustrated and described herein, it will be understood that this description is only a description of a single embodiment of the present invention and various changes and modifications may be incorporated and embodied therein.

I claim:

1. Apparatus for determining the refractive and astigmatic error of an eye including: means to form and direct into the eye and onto the retina of the eye a generally circular pattern of radiant energy, means to obtain a pattern of the image of said circular pattern reflected from the retina back through the media of the eye, and means to measure the deviation of said obtained pattern of said image from a circular pattern of predetermined diameter to obtain a measurement of the refractive and astigmatic error of the eye.

2. Apparatus in accordance with claim 1 in which the means to form and direct the circular pattern of radiant energy comprises a source of radiant energy, a first lens system to form at least one narrow beam of radiant energy and direct the same toward the retina of the eye, and means to translate the formed narrow beam along a predetermined arcuate path about the optical axis of the eye to produce a circular annular trace of radiant energy.

3. Apparatus in accordance with claim 2 in which said first lens system has an optical axis coaxial with the optical axis of the eye and said circular annular trace is formed normal to and coaxial with the optical axis of the eye.

4. Apparatus in accordance with claim 2 including a second lens system positioned intermediate the eye and the means for obtaining a pattern of the image reflected from the retina of the eye, said second lens system being adjustable between a first position in which the obtained pattern of the image reflected from the retina for a relaxed emmetropic eye is circular and is of said predetermined diameter and a second position in which the obtained pattern of the image reflected from the retina for an accommodating emmetropic eye is a point.

5. Apparatus in accordance with claim 4 in which the means to obtain the pattern of the image reflected from the retina includes a film support plate and a sheet of film sensitive to the radiant energy.

6. Apparatus in accordance with claim 4 including an adjustable target on which the eye can focus, said target being positioned between said first lens system and the eye being tested.

7. Apparatus for determining the refractive and astigmatic error of an eye including a source of radiant energy, a first lens system having a predetermined optical axis, means to position said first lens system relative to the eye being tested to place the optical axis of said first lens system coaxial with the optical axis of the eye being tested, said first lens system operable to form a narrow beam of radiant energy from said source of radiant energy and direct said beam toward and into the eye being tested and onto the retina of said eye, means in said first lens system to translate said beam of light in a predetermined arcuate path about the optical axis of said eye to expose the retina to an annular circular trace of radiant energy, said circular trace of radiant energy being reflected out of the eye from the retina through the optical media of the eye, a second lens system having a predetermined optical axis positioned at an angle to the optical axis of said first lens system, means to direct said reflected annular circular trace of radiant energy into said second lens system, means to obtain and record a pattern of the image of said reflected trace of light from said second lens system, and means to measure the deviation of said obtained pattern from a circular pattern of predetermined diameter to obtain a measurement of the refractive and astigmatic error of the eye.

8. Apparatus in accordance with claim 7 in which said first lens system includes an apertured plate having apertures thereon equally spaced from the optical axis of said first lens system through which radiant energy from said source of radiant energy passes in the form of a plurality of spaced narrow beams equal in number to the plurality of said apertures and in a direction parallel to the optical axis of said first lens system, means within said first lens system to translate all of said spaced narrow beams along an arcuate path about the optical axis of said first lens system to form a circular annular trace of radiant energy, and at least one lens within said first lens system to converge said spaced beams of radiant energy inwardly and direct the same into the eye being tested.

9. Apparatus in accordance with claim 7 in which the means in said first lens system to translate said beam of light in a predetermined circular path includes a prism having first and second reflective surfaces and a mirror mounted normal to the prism, the first reflective surface of said prism being positioned in the path of the beam of light and operable to reflect the beam of light to said mirror, said mirror operable to reflect said beam of light to said second reflective surface, and means mounting said prism and said mirror for rotating as a unit about the optical axis of said lens system.

10. A process for determining the refractive and astigmatic error of an eye comprising the steps of projecting a circular beam of radiant energy coaxial with the optical axis of the eye onto the retinal surface of the eye, obtaining a reflection of said circular beam from the retinal surface of the eye and through the optical media of the eye, forming an image of said reflection of the beam of radiant energy, and measuring the deviation of said obtained image from a circular pattern of predetermined size to obtain a measurement of the refractive and astigmatic error of the eye.

11. A process in accordance with claim 10 in which said projected circular beam of radiant energy is formed by projecting spaced beams of radiant energy onto the retinal surface of the eye, and translating said spaced beams in similar arcuate paths to expose the retinal surface of the eye to a circular annular trace of radiant energy.